United States Patent
Klemmensen et al.

(10) Patent No.: US 11,051,296 B2
(45) Date of Patent: Jun. 29, 2021

(54) MULTIPLE TRANSMISSION NETWORK

(71) Applicant: Oticon A/S, Smørum (DK)

(72) Inventors: Bjarne Klemmensen, Smørum (DK); Peter Søren Kirk Hansen, Smørum (DK)

(73) Assignee: Oticon A/S, Smørum (DK)

( * ) Notice: Subject to any disclaimer, the term of this patent is extended or adjusted under 35 U.S.C. 154(b) by 333 days.

(21) Appl. No.: 15/481,967

(22) Filed: Apr. 7, 2017

(65) Prior Publication Data
US 2017/0295573 A1 Oct. 12, 2017

(30) Foreign Application Priority Data

Apr. 8, 2016 (EP) .................................... 16164535

(51) Int. Cl.
*H04W 72/04* (2009.01)
*H04R 27/02* (2006.01)
(Continued)

(52) U.S. Cl.
CPC ...... *H04W 72/0446* (2013.01); *H04R 25/554* (2013.01); *H04W 4/08* (2013.01);
(Continued)

(58) Field of Classification Search
CPC ....... H04W 4/08; H04W 48/12; H04W 48/14; H04W 48/16; H04W 84/20; H04R 25/00-75
See application file for complete search history.

(56) References Cited

U.S. PATENT DOCUMENTS

2008/0095072 A1* 4/2008 Shao ..................... H04W 8/005
370/254
2009/0290586 A1* 11/2009 Ban ......................... G06F 9/546
370/394

(Continued)

*Primary Examiner* — Michael Thier
*Assistant Examiner* — Prince A Mensah
(74) *Attorney, Agent, or Firm* — Birch, Stewart, Kolasch & Birch, LLP

(57) ABSTRACT

A wireless communication method and a system comprising a first audio source unit and at least a second audio source unit each comprising; a connection management interface for connecting to a network topology, a protocol management interface, a management link and a communication link, and during a configuration period the first audio source unit may be configured to listen for a notification packet via the management link, and, based on a first criteria, the first audio source unit may be configured to establish, via the protocol management interface, a communication group and a respective communication frame. Furthermore, where the first audio source unit may be a coordinator of the communication group, the coordinator may then be configured to establish notification packets in the communication frame, and the notification packets may then be transmitted via the management link assigned to a first time interval in the communication frame. During the configuration period, the second audio source unit may be configured to listen for a notification packet received? via the management link of the second audio source unit, the second audio source unit receives at least the notification packet and may be configured to extract, via a protocol management interface link, information of the management link of the coordinator from the received notification packet, and the second audio source unit may then be configured to transmit an ID information via the management link of the coordinator of the communication group, and where the coordinator may be configured to assign a second time interval for a communication link of the second audio source unit in the communication (Continued)

frame, the second audio source unit may then be configured to become an audio source member of that communication group. During a data communication period the second audio source member may be configured to communicate via the communication link of the audio source member at the second time interval in the communication frame to a sink unit.

24 Claims, 8 Drawing Sheets

(51) Int. Cl.
*H04W 76/11* (2018.01)
*H04W 76/15* (2018.01)
*H04R 25/00* (2006.01)
*H04W 4/08* (2009.01)
*H04W 4/80* (2018.01)
*H04W 84/20* (2009.01)

(52) U.S. Cl.
CPC ............ *H04W 76/11* (2018.02); *H04W 76/15* (2018.02); *H04R 25/43* (2013.01); *H04R 27/02* (2013.01); *H04R 2225/55* (2013.01); *H04R 2227/003* (2013.01); *H04W 4/80* (2018.02); *H04W 84/20* (2013.01)

(56) References Cited

U.S. PATENT DOCUMENTS

| | | |
|---|---|---|
| 2010/0272054 A1 | 10/2010 | Tatsuta et al. |
| 2011/0019646 A1* | 1/2011 | Jeon ...................... H04W 84/18 370/331 |
| 2011/0269456 A1 | 11/2011 | Krishnaswamy et al. |
| 2014/0192988 A1* | 7/2014 | Solum .................. H04R 25/554 381/23.1 |
| 2014/0233527 A1* | 8/2014 | Gehring ............... H04R 25/554 370/330 |
| 2015/0200811 A1 | 7/2015 | Kasslin et al. |
| 2015/0208956 A1* | 7/2015 | Schmitt .................. A61B 5/123 600/559 |
| 2015/0326984 A1 | 11/2015 | Haubrich et al. |
| 2016/0205616 A1* | 7/2016 | Oren ....................... H04W 4/08 370/254 |

* cited by examiner

MULTIPLE TRANSMISSION NETWORK

TECHNICAL FIELD

The disclosure relates to a short-range, multiple transmission network including a coordinator for controlling the communication between audio sources and sink units.

BACKGROUND

Currently, it is known that wireless short-range communication is possible between two audio devices or between an audio device and multiple sink units (i.e. receivers), and furthermore, is known that for coordinating communications between multiple audio sources in a wireless short-range communication network n intermediate control device is needed.

Furthermore, modern hearing assistance devices, such as hearing aids, typically include digital electronics to enhance the wearer's listening experience. However, in situations where multiple people speak simultaneously, e.g. at a conference or lectures, a hearing impaired will be limited in his or her participation to the discussion since today's hearing aids are only configured to receive one audio stream at a time. Therefore, in order to improve the listening experience for a hearing impaired, a simple system for allowing multiple audio sources to communicate to at least a hearing device, i.e. a sink unit, simultaneously or mixed is needed.

SUMMARY

An object of the present disclosure is to provide a wireless communication system which is configured to coordinate multiple transmissions from a plurality of audio source units to one or more sink units. The present disclosure provides a simple way to achieve this by utilizing the link structure of a wireless short range communication protocol, such as Bluetooth low energy, digital enhanced cordless telecommunications (DECT), WIFI etc.

The advantage of coordinating the multiple transmissions between the audio source units and a sink unit is that the sink unit is able to receive simultaneously or in parallel communication from the plurality of the audio source units.

The advantage of utilizing the link layer of a communication frame in order to establish communication between a plurality of audio source members and at least a sink unit via the communication frame of the coordinator is that the establishment is less complexed compared to known solution within this area.

Objects and advantages of the present disclosure are achieved by the present disclosure and drawings, and by the accompanying claims.

The present disclosure further at least provides an alternative to the known systems.

An object of the present disclosure is achieved by a wireless communication system comprising a first audio source unit and at least a second audio source unit each comprising; a connection management interface for connecting to a network topology, a protocol management interface, a management link and a communication link, and during a configuration period the first audio source unit may be configured to listen for a notification packet via the management link, and, based on a first criteria, the first audio source unit may be configured to establish, via the protocol management interface, a communication group and a respective communication frame. Furthermore, where the first audio source unit may be a coordinator of the communication group, the coordinator may then be configured to establish notification packets in the communication frame, and the notification packets may then be transmitted via the management link assigned to a first time interval in the communication frame. During the configuration period, the second audio source unit may be configured to listen for a notification packet received? via the management link of the second audio source unit, the second audio source unit receives at least the notification packet and may be configured to extract, via a protocol management interface link, information of the management link of the coordinator from the received notification packet, and the second audio source unit may then be configured to transmit an ID information via the management link of the coordinator of the communication group, and where the coordinator may be configured to assign a second time interval for a communication link of the second audio source unit in the communication frame, the second audio source unit may then be configured to become an audio source member of that communication group. During a data communication period the second audio source member may be configured to communicate via the communication link of the audio source member at the second time interval in the communication frame to a sink unit.

A further object of the present disclosure is achieved by a wireless communication system comprising a first audio source unit and at least a second audio source unit each comprising; a connection management interface for connecting to a network topology, a protocol management interface, a management link and multiple communication links, and during a configuration period the first audio source unit may be configured to listen for a notification packet via the management link, and based on a first criteria, the first audio source unit may be configured to establish via the protocol management interface a communication group and a respective communication frame. Furthermore, where the first audio source unit may be a coordinator of the communication group, the coordinator may then be configured to establish notification packets in the communication frame, and the notification packets may be transmitted via the management link assigned to a first time interval in the communication frame. During the configuration period, the second audio source unit may be configured to listen for a notification packet via the management link of the second audio source unit, the second audio source unit may receive at least the notification packet and may extract, via a protocol management interface link, information of the management link of the coordinator from the received notification packet, and the second audio source unit may then be configured to transmit an ID information via the management link of the coordinator of the communication group, and where the coordinator assigns multiple other time interval for the communication links of the second audio source unit in the communication frame, the second audio source unit may become an audio source member of that communication group. During a data communication period the second audio source member may be configured to communicate via the multiple communication links of the audio source member at the given time intervals in the communication frame to a sink unit.

The maximum number of communication links assigned to one audio source member may be between 2 and 5, 2 and 10, 2 and 20, or 2 and 40.

Throughout the present disclosure it will be understood that the communication links and the management links may be based on a wireless link, such as Bluetooth low energy, customized Bluetooth low energy or any kind of a Bluetooth link.

It is an advantage that a sink unit may be configured to communicate with multiple audio source units since the sink unit, e.g. a hearing device, is able to receive multiple audio streams from multiple audio source units. For example, the hearing device may for example receive audio streams from one or more intermediate streaming devices for a communication device, and/or one or more wireless microphones, and/or one or more intermediate devices for a television.

It is an advantage that the wireless communication system according to the present disclosure allows multiple audio source units to communicate with at least a sink unit, so that the sink unit may receive multiple audio streams or embedded data from the multiple audio source units simultaneously or mixed with a short time delay between the audio streams. For example, the sink unit, e.g. being a hearing device, may receive audio streams from one or more intermediate streaming device configured to stream an audio signal between a second streaming device/a communication device and a hearing device, and/or one or more wireless microphones, and/or one or more intermediate streaming device configured to stream an audio signal between a television and a hearing device. Furthermore, the intermediate streaming device may be used for controlling program shifts and volume of the hearing device.

Furthermore, the wireless communication system according to the present disclosure allows for example a hearing device to adapt to several different audio streaming environments without requiring any interaction from the user of the hearing device. Examples on how a typical user would organize a set of audio source units in different audio streaming environments is outlined below.

Stationary audio source units, such as streaming devices streaming sound from a television, should have the highest prioritization level such that such a stationary, intermediate device always act as a coordinator. If more than one TV, having such a streaming device, is turned on, the user may select the desired one via an interface in the hearing device or in an external device, such as a remote control or a mobile phone. The intermediate streaming device may optionally be built into the TV directly or be a device connected externally to the TV, either wired or wirelessly.

Mobile audio source units, such as wireless microphones (e.g. partner or table), should be on the second highest prioritization level because these are battery powered and paired with a communication group coordinated by an intermediate device connected to a TV, meaning that they will join the communication group as audio source members to when a TV is on and designated as the coordinator of that communication group—otherwise they will launch their own network with one microphone as the coordinator. If a TV is discovered afterwards (background scanning), the communication group coordinated by one of the wireless microphones will be teardown by the intermediate device for a TV and the intermediate device establish a new communication group which it becomes the coordinator of and inform the audio source members to join (the wireless microphones).

Personal single audio source unit, such as the intermediate streaming device for a communication device, should be on the lowest prioritization level and paired with both the stationary and mobile audio source units in the same communication group coordinated by a an intermediate device for a TV. Thus, if the phone rings while the user is listening to the TV and at the same time conversing with his or her spouse via a wireless microphone, then the intermediate streaming device for the phone, e.g. a smartphone, will just join the communication group and the communication frame established by the coordinator (The intermediate device for the TV in this specific situation), and await that the user accept the call. When the user has accepted the call, the audio streaming received via the intermediate streaming device for a communication device may be streamed to the hearing device or other sink units while the audio streams from the other audio source members (the mobile audio source units and/or the stationary audio source units) are muted.

An audio source unit, e.g. the first audio source unit or the second audio source unit, may be an audio streaming device configured to stream audio and/or embedded data via a wireless interface to one or more another units, for example, a hearing device. The audio source unit may be a wireless microphone, a mobile phone, an intermediate device for streaming audio from mobile phone to a hearing device, an intermediate device for streaming audio from for streaming audio to a hearing device or other suitable audio sources streaming audio and/or embedded data.

A sink unit may for example be a device which is able to decode audio streams or embedded data into an acoustic signal and provide the acoustic signal into an ear of a user of the sink unit. In the context of the present disclosure, the sink unit may preferably be a hearing device, such as a hearing aid or a headset.

The role of the coordinator may be to coordinate the communication of audio streams and/or embedded data between multiple audio source members and one or more sink units. By coordinating the communication from the audio source members to the sink units, each sinks unit may receive multiple audio streams or embedded data from multiple audio source members resulting in that the user of the sink unit may listen to the multiple audio streams simultaneously or mixed, e.g. at individual or fixed mixing levels.

The coordinator may communicate with the one or more sink units by transmitting audio streams and/or data. Additionally or alternatively, the coordinator may forward audio streams and/or embedded data from one or more audio source members to one or more sink units.

The coordinator may receive ID information from an audio source unit that wish to be a member of the communication group, and the coordinator is configured to assign the respective audio source unit to a respective time interval, different from the time interval of the management link (and of the notification packet) of the communication frame, and the audio source unit then becomes a member of that communication group. The communication frame established by the coordinator may be a MAC frame.

The communication frame may comprise time intervals, or time slots, for one or more communication links of each audio source member and/or a coordinator. Furthermore, the communication frame may comprise management links of each audio source member and a coordinator. For example, the properties of the communication frame may be arranged such that the first event in the communication frame may be a management link. Thus, once an audio source unit detects a notification packet received via the management link of the audio source unit, it may then be possible for the audio source unit to establish communication frame synchronization and listen to a management link of a coordinator of the communication group.

Furthermore, the communication frame comprises communication links of audio source members of the respective communication group and/or the coordinator of the respective communication group. The communication links may be used for communicating audio streams and/or data. The number of communication links in the communication frame may be extracted from the notification packet transmitted by the coordinator.

When an audio source unit has detected a notification packet and the respective coordinator assigns the audio source unit to a time interval in the communication frame, the audio source unit becomes an audio source member of that respective communication group coordinated by the coordinator, a pairing between the coordinator and an audio source member may then be initialized. From the pairing, the audio source member may receive static setup information which reveals the event layout of the entire communication frame, i.e. the anchor point of the remaining events (i.e. the timing of the communication links of the coordinator and other audio source members of that respective communication group) in the communication frame are offset from the already established anchor point of the management link.

The audio source member may have multiple communication links. By having two communication links the audio source member may be configured to stream audio in stereo and/or embedded data in parallel to one or more sink units.

The management link provides several management tasks such as:
- A potential audio source member may request usage of one or more available time intervals inside the communication frame to one or more communication links, and which may be granted via for example a management packet transmitted to the audio source member via the management link of both the audio source member and the coordinator.
- An audio source member may occasionally return information about reception quality (bad frequency channels) to the coordinator.
- The coordinator may decide to leave the communication group and handover the management link to an audio source member of that communication group. This may require duplex communication between the two devices.

The management link may provide a return link where one or more audio source members may communicate to the coordinator.

By having a single communication link, the communication frame may include a connection event for the communication link which comprises, for example at least three packets. The time duration of the connection event may be equal or below 1000 us pr. time interval, but the connection event may span several time intervals wherein the event may comprise several packets, such as 1 to 5 packets, or 1 to 10 packets or above 10 packets. The first packet in the connection event, e.g. the management link, may be a time synchronization point, used for indication of synchronization status between for example two communication links of an audio source member. A global frequency hopping may be between connection event to connection event of the communication link, and a local frequency hopping may be between packet to packet within the connection event.

The notification packet may be located between connection events and points to the next coming connection event, i.e. the notification packet may comprise: the link information to the management link of the coordinator, three time variant parameters: a current value of the event counter, a time interval offset to the next communication link, and a state of the global frequency hopping.

The audio source member, or the coordinator, may have two communication links for communicating audio streams and/or data. The communication frame may be similar to the communication frame comprising a single communication link for each audio source member but with additional properties, such as;
- The communication frame may comprise two connection events for each audio source member,
- Both connection events may comprise a first packet used for synchronization point. The second synchronization point may be needed if only the second communication link is received,
- Both communication links may have identical setup parameters, such as number of retransmissions, packet interval, etc.,
- Both communication links may be advertised in the same notification packet. This requires the three time variant parameters to be linked as:
  - Same connection event counter value for both communication links in the same communication frame,
  - A time offset in between the two connection events may be an integer number of 1000 us time interval,
  - The global frequency hopping may be chained together, i.e. the state of the global frequency hopping is partially based on the same seed values (event counter and ID information) such that only one set of values needs to be published in the notification packet in order to find both communication links.
  - Thus, the time and frequency of the first synchronization point must be adjusted by the time interval offset and frequency hopping offset published in the notification packet.

An audio source member may only be member of one communication group. The audio source member may be informed by the notification packet the addresses of all the other audio source members in the communication group. However, the audio source member can be paired with several devices to join different communication groups in different streaming sessions.

An audio source member may not be aware of audio source units that are not part of the communication group. However, these other audio source units can still participate in the communication frame if they are paired with the communication group by transmitting theirs ID information via a management link to the coordinator of that communication group.

The communication groups may be divided into prioritization levels going from high to low. One communication group at a lower level can be paired with another group at a higher level, i.e. all the audio source members of the communication group at a lower level are aware of the ID information of the other audio source members of the other communication group with a higher prioritization level, but not opposite.

If an audio source member of a low level communication group finds an active higher level communication group via its management interface and its protocol management interface, then the audio source member will join the communication group with a higher level instead of starting its own communication group.

An audio source member of a lower level communication group will look for other communication groups in the background via the management link and the protocol management interface. If a higher level communication group may be detected, then the audio source member may inform the coordinator of the low level communication group to join the high level communication group. This may require a confirmation from the coordinator of the high level communication group (e.g. by assigning the audio source member a time interval in a communication frame established by the coordinator of the high level communication group) and/or a confirmation that all audio source members of the lower level communication group can see the coordinator of the higher level communication group.

The concept of pairing is just to make one audio source device unit aware of the ID information of another audio source unit. The following three pairing scenarios may occur:

Pairing between two audio source members and/or between an audio source member and a coordinator, where the pairing information of the audio source member may be transferred to the other audio source member via the management link of both members or to the coordinator via the management link of both the member and the coordinator.

Pairing a new audio source member with audio source members of an already established communication group may be done by all audio source members transferring simultaneously, or with a short delay, their ID information to the new audio source member. Thus, any audio source member must be able to deliver the needed pairing information. In this pairing scenario there is a need to deal further with the new audio source member or members after pairing. One solution could be to update a group status parameter that afterwards may be published by the coordinator, e.g. via the management link, such that paired devices can request the latest pairing information if they are out of date.

Pairing between a higher level communication group and a lower level communication group, both communication groups comprising a plurality of audio source members, without the need to do pairing individually for each audio source member of the lower level communication group. This may be accomplished when one audio source member from each communication group interexchange all pairing information of the remaining audio source members of the respective communication group, and the audio source member receiving the pairing information distributes the pairing information to the other audio source members of the respective communication group.

The coordinator may utilize the management link for creating communication group and announce the communication group to other audio source units. When an audio source unit requests to join the communication group as member, then the audio source unit shall connect to the coordinator via the management link and announce its identity by transferring its ID information. The coordinator will assign the audio source member a time interval in the communication frame and a dynamic address which may used for future link management purposes.

The coordinator shall on regular basis publish the identity (pairing information) of connected audio source members, via notification packets transmitted via the management link, to sink units informing the availability of the audio source members. When theses audio source members show up in the sink unit's source option, then they should be paired and the communication between the audio source members and the sink unit may begin.

The configuration period may be defined as being the period where an audio source unit requests an available communication group by listening for a notification packet. The configuration period may be set to a time value.

The coordinator may assign a time interval for a second communication link which may be for the coordinator or another audio source member.

The coordinator may have a communication link, and the coordinator may be configured to transmit and or receive audio streams and data.

The coordinator may be configured to coordinate via the communication frame the communication between a plurality of audio source members of the communication group and at least a sink unit such that the at least one sink unit may be configured to receive communications from the plurality of audio source members. The user of the sink unit may experience a mix of audio streams.

The first criteria may be that the first audio source unit does not receive a notification packet within the configuration period, or the first criteria may be that the first audio source unit receives a notification packet from a coordinator, the notification packet may be prioritized by the first audio source unit according to a prioritization scheme, and the first audio source unit may then be configured to reject the notification packet if the prioritization of the notification packet is not acceptable of the first audio source unit.

The prioritization may be based on the type of coordinator, e.g. is it an intermediate device for a TV, a wireless microphone, a mobile phone, an intermediate streaming device for a communication device, or the mobility of the coordinator etc. Additionally, the prioritization may be based on the signal quality (e.g. RSSI) of the coordinator, the number of audio source member in the respective communication group, number of sink units connected to the communication group etc. These information may be available via the notification packet.

The first audio source unit and the second audio source unit, i.e. an audio source unit, may each comprise a data interface configured to generate audio streams and/or embedded data for being communicated to the sink unit via the communication link.

Furthermore, the data interface may also be configured to receive and forward wireless audio streams and/or embedded data via the communication link to sink units or the coordinator.

The coordinator may be configured to merge the communication group with a second communication group when at least an audio source member of the communication group detects a second coordinator of the second communication group via the management link and the protocol management interface. When the audio source member has informed the coordinator about the second communication group, the coordinator may be configured to command the audio source member to transfer to the second communication group via the management link by forwarding the ID information of the audio source member to the second coordinator. Alternatively, when the audio source member has informed the coordinator about the second communication group the coordinator may be configured to command the audio source member to transfer to the second communication group via the management link by forwarding the ID information of the audio source member to the second coordinator when the coordinator has communicated a merging request to the second coordinator via the management link and receives an accept on the merging signal from the second coordinator. Alternatively, when the audio source member has informed the coordinator about the second communication group the coordinator may be configured to command the audio source member to transfer to the second communication group, and the audio source member may be configured to transfer its ID information to the second coordinator.

A further aspect of the present disclosure relates to a coordinator of a communication group configured to coordinate communication between a plurality of audio source members of a communication group and at least a sink unit in a network topology. The coordinator may comprise; a connection management interface, a protocol management interface, a management link, provided in a communication frame established by the coordinator, and where the coordinator may be connected to the network topology via the connection management interface. During a configuration period the coordinator may be configured to establish notification packets including link information of the management link via the protocol management interface and to transmit the notification packets via the management link assigned to a first time interval in the communication frame, and if receiving ID information from at least one audio source unit via the management link in response to one or more of the notification packets, the coordinator may be configured to assign a second time interval for the communication link of the audio source unit in the communication frame, wherein the audio source unit is an audio source member of the communication group.

An additional object of the present disclosure is achieved by a coordinator of a communication group configured to coordinate communication between a plurality of audio source members of a communication group and at least a sink unit in a network topology. The coordinator may comprise; a connection management interface, a protocol management interface, a management link provided in a communication frame established by the coordinator, and where the coordinator may be connected to the network topology via the connection management interface. During a configuration period the coordinator may be configured to establish notification packets including link information of the management link via the protocol management interface and transmit the notification packets via the management link assigned to a first time interval, and if receiving ID information from at least one audio source unit, via the management link, in response to one or more of the notification packets, the coordinator may be configured to assign respective time intervals for respective communication links of the audio source unit in the communication frame, wherein the audio source unit is an audio source member of the communication group.

In general, the notification packets may be transmitted periodically or randomly, i.e. the coordinator may assign the notification packets to the communication frame periodically or randomly.

Additionally, during a data communication period the second audio source member may be configured to communicate via the communication link(s) at the given time interval(s) in the communication frame to the sink unit.

The coordinator may have one or more communication links for communicating audio streams and/or embedded data to a sink unit.

The coordinator may receive a notification packet from a second coordinator of a second communication group via the management link, and according to a prioritization scheme, the coordinator may be configured to leave the communication group and join the second communication group as an audio source member of the second communication group when transmitting an ID information via the management link to the second coordinator, and the second coordinator confirms by assigns the coordinator a time interval in a communication frame established by the second coordinator.

The coordinator may be configured to transmit a coordinator request to an audio source member of the communication group via the management link, and if the coordinator receives an accept from the audio source member in response to the coordinator request, the audio source member may then be appointed as the coordinator of the communication group.

A further object of the present disclosure is achieved by an audio source member of a communication group coordinated by a coordinator, and where the audio source member may be configured to communicate to at least a sink unit. The audio source member comprises; a connection management interface, a protocol management interface, a management link and at least one communication link, provided in a communication frame generated by the coordinator, and where the audio source member may be connected to the network topology via the connection management interface. During a configuration period the audio source member may be configured to receive a notification packet via the management link and extracts via the protocol management interface link information of the management link of the coordinator of a communication group from the received notification packet. The audio source member may then be configured to transmit its ID information in response to the received notification packet via the management link, and the at least one communication link of the audio source member may be assigned by the coordinator to a time interval in the communication frame, and during a data communication period the audio source member may be configured to communicate to the at least sink unit via the at least one communication link.

An additional object of the present disclosure is achieved by an audio source member of a communication group coordinated by a coordinator, and where the audio source member may be configured to communicate to at least a sink unit. The audio source member may comprise; a connection management interface, a protocol management interface, a management link and multiple communication links, provided in a communication frame generated by the coordinator, and where the audio source member may be connected to the network topology via the connection management interface. During a configuration period the audio source member may be configured to receive a notification packet via the management link and extract via the protocol management interface link information of the management link of the coordinator of a communication group from the received notification packet. The audio source member may then be configured to transmit its ID information in response to the received notification packet via the management link, and each of the multiple communication links of the audio source member may be assigned by the coordinator to a time interval in the communication frame, and during a data communication period the audio source member may be configured to communicate to the at least sink unit via the multiple communication link.

The audio source member may communicate to the sink unit mixed or simultaneously with other audio source members of the same communication group.

The audio source member may comprise a data interface configured to generate audio streams and/or embedded data for being communicated to the at least sink unit via the communication link(s).

The communication link may be based on Bluetooth low energy communication protocol, Bluetooth communication protocol, or a customized Bluetooth (low energy) communication protocol.

The management link may be based on Bluetooth low energy communication protocol, Bluetooth communication protocol, or a customized Bluetooth (low energy) communication protocol.

A plurality of audio source members may be configured to communicate to the at least one sink unit where the audio streams and/or data are streamed simultaneously or with a time delay between each audio streams/data of each audio source member. The user of the sink unit, being for example a hearing device, is then able to hear all the users of the audio source members at the same. This is ideal in a conference situation where the user will like to be part of a discussion between the talkers (e.g. a talker using a wireless microphone being a member of a communication group established by one of the talkers) at the conference.

The audio source member may be a combination of a sink unit and an audio source unit, the audio source member may then be configured to communicate/transmit and receive audio streams. The audio source member may be; an intermediate streaming device, such as a router, transponder, relay etc. or a hearing device.

The audio source member may be configured to be a coordinator of the communication group when accepting a coordinator request transmitted by the coordinator of the communication group via the management link.

A further object of the present disclosure is achieved by a method for coordinating communication between a plurality of audio source members of a communication group and at least a sink unit in a network topology, during a configuration period a first audio source unit may be configured to:

connecting to a network topology via a connection management interface, listening for a notification packet via a management link, establishing a communication group based on a first criteria, and the first audio source unit is a coordinator of the communication group, establishing notification packets via a protocol management interface and transmitting the notification packets via the management link assigned a first time interval in a communication frame established by the coordinator, and during the configuration period a second audio source unit may be configured to:

connecting to a network topology via a connection management interface, listening for a notification packet via a management link, receiving the notification packet via the management link including link information to the management link of the coordinator of the communication group in the communication frame, transmitting ID information via the management link to the coordinator, and during the configuration period the coordinator may be configured to:

assigning a second time interval for a communication link of the second audio source member in the communication frame, and the second audio source unit is becoming a second audio source member of the communication group, and during a data communication period the second audio source member may be configured to:

communicating via the communication link to one or more sink units.

An additionally object of the present disclosure is achieved by a method for coordinating communication between a plurality of audio source members of a communication group and at least a sink unit in a network topology, during a configuration period a first audio source unit may be configured to:

connecting to a network topology via a connection management interface, listening for a notification packet via a management link, establishing a communication group based on a first criteria, and the first audio source unit is a coordinator of the communication group, establishing notification packets via a protocol management interface and transmitting the notification packets via the management link in a communication frame established by the coordinator, and during the configuration period a second audio source unit may be configured to:

connecting to a network topology via a connection management interface, listening for a notification packet via a management link, receiving the notification packet via the management link including link information to the management link of the coordinator of the communication group in the communication frame, transmitting ID information via the management link to the coordinator, and during the configuration period the coordinator may be configured to:

assigning a time interval for each multiple communication links of the second audio source member in the communication frame, and the second audio source unit is becoming a second audio source member of the communication group, and during a data communication period the second audio source member may be configured to:

communicating via the communication links to one or more sink units.

Additionally, or alternatively, the coordinator may assign a time interval for a communication link to itself, i.e. the communication link is for the coordinator.

The communication link and/or the management link may be based on a short range wireless network technology, e.g. Bluetooth low energy, Bluetooth Basic Rate/Enhance Data Rate (BR/EDR), or WIFI.

The network topology may be based on a short range wireless network technology, e.g. Bluetooth low energy, Bluetooth Basic Rate/Enhance Data Rate (BR/EDR), or WIFI.

If the audio source unit (an audio source member or a coordinator) has multiple communication links, each link may be based on different short range wireless network technologies.

Each audio source member of the communication group may be ranked by the coordinator of the communication group, and if the coordinator leaves the communication group the audio source member having the highest ranking may be designated the coordinator of the communication group.

The coordinator may be configured to dynamically vary the data capacity of the respective time interval based on the size of an audio streams packet and/or embedded data packet transmitted by the audio source member.

The coordinator may be configured to assign a time interval for each communication link of a plurality of communication links for an audio source member.

The audio source member may be an audio source unit in the form of:
  a wireless microphone,
  an audio streamer comprising Bluetooth or Bluetooth low energy interface
  an intermediate device for a TV, wherein the intermediate device comprises a Bluetooth low energy interface,
  a hearing device, or
  any devices which are configured to communicate audio streams to one or more sink units.

A coordinator of a communication group is configured to coordinate communication between a plurality of audio source members of the same communication group and at least a sink unit in a network topology, the coordinator may comprise;
  a connection management interface,
  a protocol management interface,
  a management link provided in a communication frame established by the coordinator, and
  where the coordinator may be connected to the network topology via the connection management interface, and during a configuration period the coordinator may be configured to establish notification packets including link information of the management link via the protocol management interface and to transmit the notification packets via the management link, and if receiving ID information from at least one audio source unit via the management link in response to one or more of the notification packets, the coordinator may be configured to assign a time interval for a communication link of the audio source unit in the communication frame, and the coordinator may be configured to publish ID information of one or more audio source member of the communication group, via the management link, to one or more sink units, and the notification packet includes link information of the management link.

A sink unit may be configured to wirelessly communicate with a plurality of audio source members of a communication group, wherein the sink unit may comprise;
  a connection management interface,
  a protocol management interface,
  a management link and a communication link, and
  where when the sink unit is connected to the network topology via the connection management interface the sink unit may then be configured to receive a notification packet via the management link and extract via the protocol management interface link information of the management link of the coordinator of a communication group, the sink unit may then be configured to receive ID information, via the management link, of one or more audio source members of the communication group, and the sink unit may then be configured to communicate with plurality of audio source members of the communication group.

The ID information may comprise pairing information of a respective audio source member and/or a respective coordinator.

The sink unit may be configured to select one or more audio source members either manually or automatically via a user interface of an external device, e.g. a mobile phone.

In any embodiments, the coordinator may assign multiple communication links to itself and/or multiple communication links to one or more audio source members.

By for example having two communication links it may be possible to stream a stereo signal to the receiver, i.e. the sink unit.

A further object of the present disclosure is achieved by a method for coordinating communication in a wireless network topology, where the communication in the wireless network topology includes communication between a plurality of audio source members of a communication group and at least a sink unit, wherein the plurality of audio source members includes a first audio source unit and a second audio source unit, the first audio source unit may be configured to communicate via a first communication frame, and during a configuration period the first audio source unit may be configured to:
  connecting to the wireless network topology via a connection management interface in the first communication frame,
  listening for a notification packet in the wireless network topology via a management link in a link layer of the first communication frame, and wherein the management link may be linked to the connection management interface,
  establishing a communication group in the wireless network topology based on a first criteria, wherein the first criteria may be based on that the first audio source unit does not receive a notification packet within the configuration period, and the first audio source unit is a coordinator of the communication group,
  establishing notification packets via a protocol management interface in the first communication frame and transmitting the notification packets via the management link assigned to a first time interval in the first communication frame.

The second audio source unit may be configured to communicate via a second communication frame, and during the configuration period the second audio source unit may be configured to:
  connecting to the wireless network topology via a connection management interface in the second communication frame,
  listening for a notification packet via a management link in a link layer of the second communication frame, wherein the management link may be linked to the connection management interface and to the management link of the first audio source unit,
  receiving the notification packet transmitted by the coordinator via the management link, and the notification packet includes link information to the management link of the coordinator of the communication group in the first communication frame,
  transmitting an ID information via the management link to the coordinator by using the link information During the configuration period the coordinator may be configured to assigning the second audio source unit to a communication link in a second time interval of the first communication frame by using the ID information of the second audio source unit, and the second audio source unit is a second audio source member of the communication group, and during a data communication period the second audio source member may be configured to communicating via the communication link to at least a sink unit.

The advantage of the coordinating of the communication in the wireless network topology includes communication between the plurality of audio source members of a communication group and at least a sink unit, is that the at least sink unit is able to receive multiple communications simultaneously, in parallel or mixed from the audio source members. Thereby, the user of the sink unit is able to receive vocal sounds recorded by the audio source members in a conference manner, i.e. the user of the sink unit is able to listen to a discussion between the users of the audio source members.

An even further object of the present disclosure is achieved by a wireless communication system configured to establish a communication between a plurality of audio source members of a communication group and at least a sink unit in a wireless network topology, wherein the plurality of audio source members includes a first audio source unit and a second audio source unit, wherein the first audio source unit comprises:
- a connection management interface in a first communication frame configured to connect the first audio source unit to the wireless network topology,
- a management link in a link layer of the first communication frame, wherein the management link may be linked to the connection management interface, and wherein the first audio source unit may be configured to listen for a notification packet via the management link during a configuration period, and wherein
- the first audio source unit may be configured to establish a communication group in the wireless network topology based on a first criteria, wherein the first criteria may be based on that the first audio source unit does not receive a notification packet within the configuration period, and the first audio source unit may be a coordinator of the communication group, and wherein the coordinator may be configured to establish notification packets via a protocol management interface in the first communication frame and transmitting the notification packets via the management link assigned to a first time interval in the first communication frame. The second audio source unit comprises:
- a connection management interface in a second communication frame configured to connect the second audio source unit to the wireless network topology,
- a management link in a link layer of the second communication frame, wherein the management link may be linked to the connection management interface and to the management link of the first audio source unit, and wherein the second audio source unit may be configured to listen for a notification packet via the management link during the configuration period, and wherein
- the second audio source unit is configured to receive the notification packet, transmitted by the coordinator, via the management link during the configuration period, and the notification packet includes link information to the management link of the coordinator of the communication group in the first communication frame, and the second audio source unit is configured to transmit an ID information via the management link to the coordinator by using the link information, and during the configuration period the coordinator is configured to assign the second audio source unit to a communication link in a second time interval of the first communication frame by using the ID information of the second audio source unit, and during a data communication period the second audio source member is configured to communicate via the communication link to at least a sink unit.

The first audio source unit and the second audio source unit each comprises a data interface in the first communication frame and the second communication frame, respectively, wherein the data interface is configured to generate audio streams and/or embedded data for being communicated to the sink unit via the communication link for the second audio source member and via a second communication link assigned to a third time interval in the first communication frame for the coordinator.

The first criteria is alternatively based on that the first audio source unit receives a notification packet from a coordinator, the notification packet is prioritized by the first audio source unit according to a prioritization scheme, and the first audio source unit is then configured to reject the notification packet if the prioritization of the notification packet is not acceptable of the first audio source unit.

The coordinator may be configured to merge the communication group with a second communication group when at least an audio source member of the communication group receives another link information from a second coordinator of the second communication group via the management link, and when the audio source member has transmitted the another link information to the coordinator via the management link;
- the coordinator may be further configured to command the audio source member to transfer to the second communication group by forwarding the ID information of the audio source members of the communication group to the second coordinator via the management link by using the another link information, or
- when the coordinator has communicated a merging request to the second coordinator via the management link and receives an accept on the merging request from the second coordinator, the coordinator may be further configured to command the audio source member to transfer to the second communication group via the management link by forwarding the ID information of the audio source member to the second coordinator by using the another link information, or
- the coordinator may be further configured to command the audio source member to transfer to the second communication group, and the audio source member is configured to transfer its ID information to the second coordinator by using the another link information.

The coordinator may be configured to coordinate via the first communication frame the communication between a plurality of audio source members of the communication group and at least a sink unit by assigning a communication link to each of the audio source members in the first communication frame, the at least sink unit may be configured to receive communications from the plurality of audio source members via the communication links in the first communication frame.

The coordinator may be configured to coordinate communication between a plurality of audio source members of the communication group and at least a sink unit in a network topology, the coordinator comprises;
- a connection management interface in a first communication frame configured to connect the coordinator to the wireless network topology,
- a management link in a link layer of the first communication frame, wherein the management link is linked to the connection management interface, and wherein the coordinator is configured to listen for a notification packet via the management link during a configuration period, and during the configuration period the coordinator is configured to establish notification packets including link information of the management link via the protocol management interface and transmit the notification packets via the management link assigned to a first time interval in the communication frame, and if receiving ID information from at least one audio source unit via the management link in response to the transmitted notification packets, the coordinator is configured to assign a second time interval for a communication link of at least the audio source unit in the communication frame, and the at least audio source unit is an audio source member of the communication group.

The coordinator may receive a notification packet from a second coordinator of a second communication group via the management link, and according to a prioritization scheme, the coordinator may be configured to leave the communication group and join the second communication group as an audio source member of the second communication group when transmitting an ID information via the management link to the second coordinator, and the second coordinator confirms by assigning the coordinator a time interval in a communication frame established by the second coordinator.

The prioritization scheme may be related to how an audio source unit/member or a coordinator prioritize a communication group. If for example the communication group comprises a plurality of audio source members being a mix of audio television streamers, smartphones and microphones, and a second communication group may comprise a plurality of audio source members being smartphones only, and if the coordinator or the audio source unit/member will only be part of a communication group comprising only smartphones may prioritize the second communication group higher than the first communication group. In this example, if the audio source unit/member or the coordinator receives notification packets from the coordinators of the two communication groups then the receiver will decide to join the second communication group due to the prioritization.

The coordinator may be configured to transmit a coordinator request to an audio source member of the communication group via the management link, and if the coordinator receives an accept from the audio source member in response to the coordinator request, the audio source member is then appointed as the coordinator of the communication group.

A plurality of audio source members of the communication group may be configured to communicate to the at least sink unit simultaneously or in parallel.

An additional object of the present disclosure is achieved by an audio source member of a communication group coordinated by a coordinator in a wireless network topology, and where the audio source member may be configured to communicate to at least a sink unit, the audio source member comprises;
  a connection management interface in a communication frame configured to connect the audio source unit to the wireless network topology,
  a management link in a link layer of the communication frame, wherein the management link may be linked to the connection management interface and to a management link of another audio source unit or the coordinator, and wherein the audio source unit may be configured to listen for a notification packet via the management link during a configuration period, and wherein
  the audio source unit may be configured to receive the notification packet transmitted by a coordinator via the management link during the configuration period, and the notification packet includes link information to the management link in a communication frame of the coordinator, and the audio source unit may be configured to transmit an ID information via the management link to the coordinator by using the link information, and during the configuration period the audio source unit may be an audio source member of the communication group when the coordinator assigns the audio source unit to a communication link in a second time interval of the communication frame of the coordinator by using the ID information of the audio source unit, and the audio source unit is an audio source member of the communication group, and during a data communication period the audio source member is configured to communicate via the communication link to at least a sink unit.

The audio source member may comprise a data interface configured to generate audio streams and/or embedded data for being communicated to the at least sink unit via the communication link.

The communication link may be based on Bluetooth low energy communication protocol.

The audio source member is a combination of a sink unit and an audio source unit, the audio source member is then configured to communicate and receive audio streams, the audio source member is;
  an intermediate streaming device, such as a router, transponder, relay etc.,
  a hearing device.

The audio source member may be configured to be a coordinator of the communication group when accepting a coordinator request transmitted by the coordinator of the communication group via the management link.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout the description and figures the same reference numerals are used for identical or corresponding parts. The individual features of each aspect may each be combined with any or all features of the other aspects. These and other aspects, features and/or technical effect will be apparent from and elucidated with reference to the illustrations described hereinafter in which.

DETAILED DESCRIPTION

Figure 1:
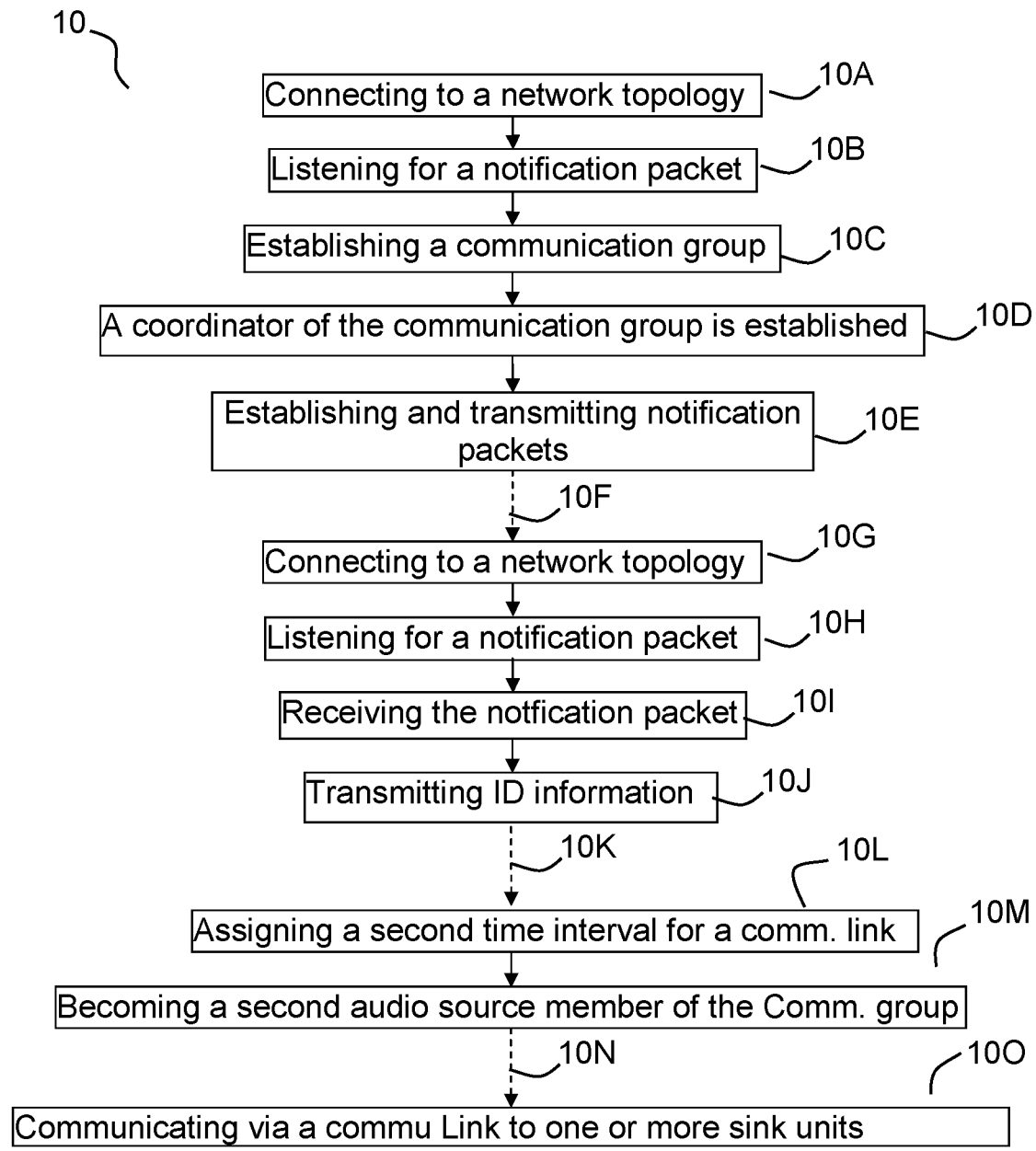
FIG. 1, illustrates a flow diagram of a method for coordinating communication between a plurality of audio source members of a communication group.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In the present context, a hearing device is conceived as a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals or with a receiver/loudspeaker arranged close to or in the ear canal such as in a Behind-the-Ear type hearing aid or a Receiver-in-the Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A hearing device may be part of a "hearing system", which refers to a system comprising one or two hearing devices, disclosed in present description, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefiting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a smart phone or other electronic device, the smart phone/electronic device possibly may run an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

FIG. 1 illustrates a flow diagram of a method for coordinating communication between a plurality of audio source members organized in a communication group and at least one sink unit in a network topology. During a configuration period a first audio source unit may be configured to connecting to a network topology via a connection management interface (10A), listening for a notification packet via a management link (10B), establishing a communication group based on a first criteria (10C), and the first audio source unit is a coordinator of the communication group (10D), establishing notification packets via a protocol management interface and transmitting the notification packets via the management link assigned a first time interval in a communication frame established by the coordinator (10E). Furthermore, during the configuration period (10F) a second audio source unit may be configured to connecting to a network topology via a connection management interface (10G), listening for a notification packet via a management link (10H), receiving the notification packet via the management link including link information to the management link of the coordinator of the communication group in the communication frame (10I), transmitting ID information via the management link to the coordinator (10J). Additionally, during the configuration period (10K) the coordinator may be configured to assigning a second time interval for a communication link of the second audio source member in the communication frame (10L), and the second audio source unit is becoming a second audio source member of the communication group (10M). Furthermore, during a data communication period (10N) the second audio source member may be configured to communicating via the communication link to one or more sink units (10O).

Figure 2A:
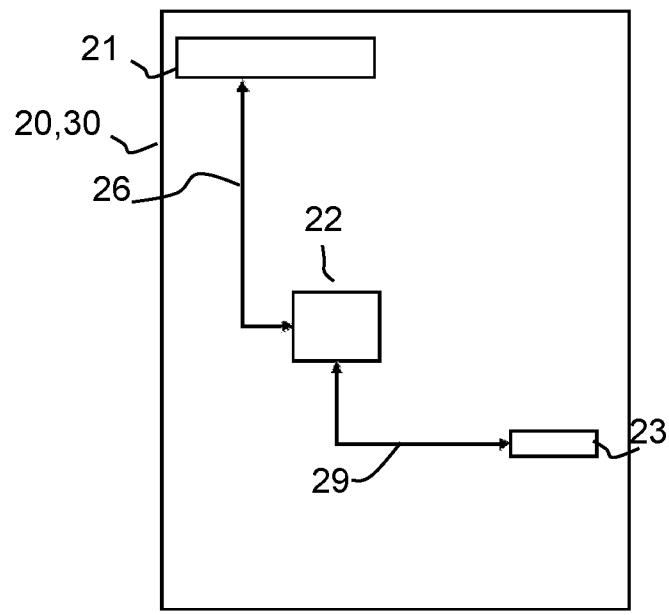
FIGS. 2A-2B, illustrates an example of a coordinator.
Figure 2B:
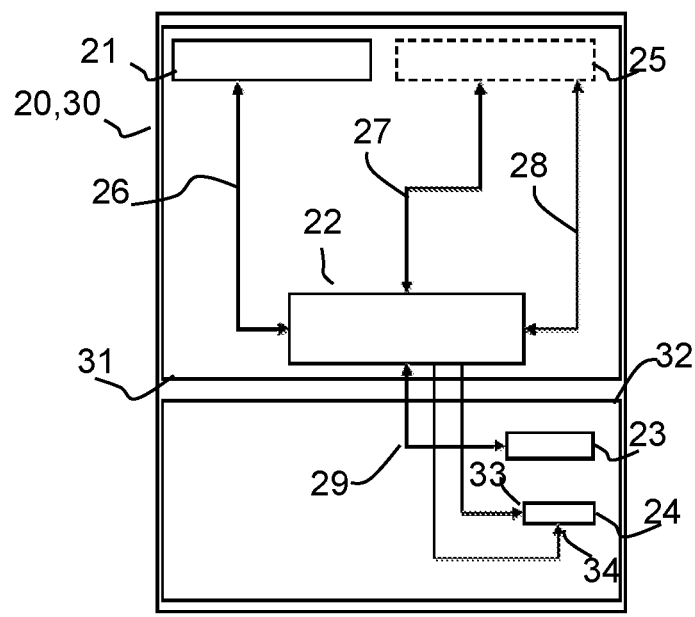

FIGS. 2A and 2B show a coordinator 20 of a communication group configured to coordinate communication between a plurality of audio source members of a communication group and at least a sink unit in a network topology via a communication frame 30 generated by the coordinator 20. In this particular example, the coordinator 20 comprises a connection management interface 21 and a protocol management interface 22. Furthermore, the coordinator 20 comprises a management link 23 provided in the communication frame 30, where the coordinator 20 is connected to the network topology (not shown in FIG. 2A) via the connection management interface 21.

In FIG. 2A, it is seen in the communication frame 30 that the connection management interface 21 is in one example configured to request the protocol management interface 22 via the request input 26 to launch a wireless communication, e.g. a Bluetooth stream setup or a Bluetooth low energy stream setup. The protocol management interface 22 is configured to establish notification packets and forwarding 29 the notification packets to the management link 23 which is assigned by the protocol management interface 22 to a time interval in the communication frame 30. The contain of the notification packets may for example be an event count for the next coming communication link of an audio source member and link information for the management link 23 of the coordinator.

In FIG. 2B, the coordinator 20 is further configured to transmit audio stream and/or embedded data via a data interface 25 which is configured to transfer the audio stream 27 and/or the embedded data 28 to the protocol management interface 22. The protocol management interface 22 attaches then a Bluetooth protocol entity (e.g. an audio stream socket) to an audio port 33 and a data port 34 of the communication link 24 reshaping a payload of the Bluetooth audio stream protocol so that the payload comprises both the audio stream and/or the embedded data. In another example the payload may only comprise the audio stream.

In FIG. 2B the communication frame has been divided into an upper layer 31 and a link layer 32, wherein the upper layer 31 comprises the connection management interface 21 and the protocol management interface 22, and alternatively, the data interface 25. The link layer comprises the management link 23 and the communication link 24.

In FIGS. 2A and 2B, during a configuration period the coordinator may receive ID information from at least one audio source unit, via the management link 23, in response to a notification packet transmitted by the coordinator via the management link 23. Via the protocol management interface 22 the coordinator assigns a communication link of the audio source unit within the communication frame to a time interval different from the time interval of the notification packet, and the audio source unit becomes an audio source member of the communication group.

In other examples the notification packet may be transmitted to the audio source unit via a notification link which is assigned to another timer interval different from the time interval of the management link.

The implementation of the data interface 25 is an alternatively.

Figure 3A:
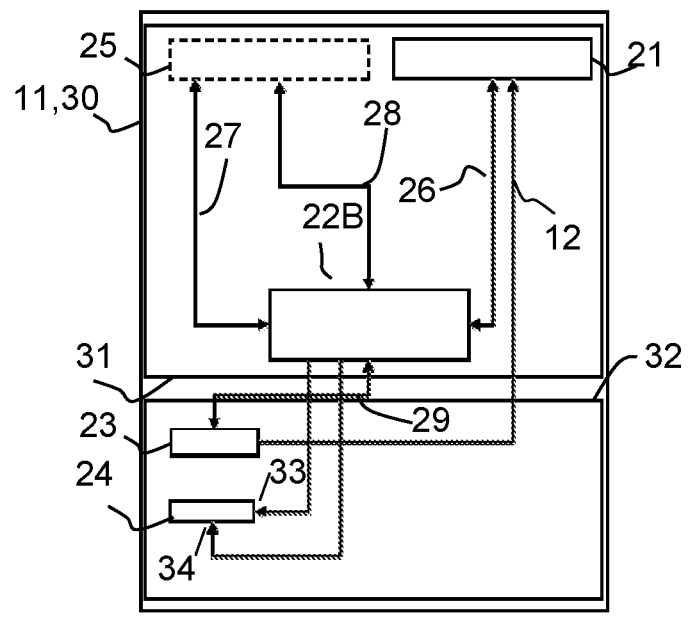
FIGS. 3A-3B, illustrates an example of an audio source member and a sink unit, respectively.

FIG. 3A shows an example of an audio source unit 11 being able to communicate to at least a sink unit and a coordinator. In the audio source member 11 the protocol management interface 22B may receive a notification packet via the management link 23 and in responds to the received notification packet the protocol management interface 22B is configured to transmit an ID information to the respective coordinator of the respective notification packet via the management link 23. The coordinator 20 updates the notification packet including one or more assigned time interval(s) to one or more communication links 24 of the audio source unit 11. The audio source unit 11 is now a member of the communication group established by the coordinator, i.e. the audio source unit is now an audio source member 11.

The audio source unit or the audio source member is further configured to establish a communication group if not receiving a notification packet or if the notification packet represent a communication group with a prioritization level that is lower than the prioritization level of the audio source member or with a prioritization level which the audio source unit or member 11 does not accept.

The audio source member 11 is further configured to transmit audio stream and/or embedded data via a data interface 25 which is configured to transfer the audio stream 27 and/or the embedded data 28 to the protocol management interface 22B. The protocol management interface 22B attaches then a Bluetooth protocol entity (e.g. an audio stream socket) to an audio port 33 and a data port 34 of the communication link 24 reshaping a payload of the Bluetooth audio stream protocol so that the payload comprises both the audio stream and/or the embedded data.

The audio source member 11 may receive a notification packet via the management link 23, and the protocol management interface 22B is configured to synchronize the Bluetooth protocol entity of the audio source member 11 to the assigned time interval(s) of one or more communication links.

Figure 3B:
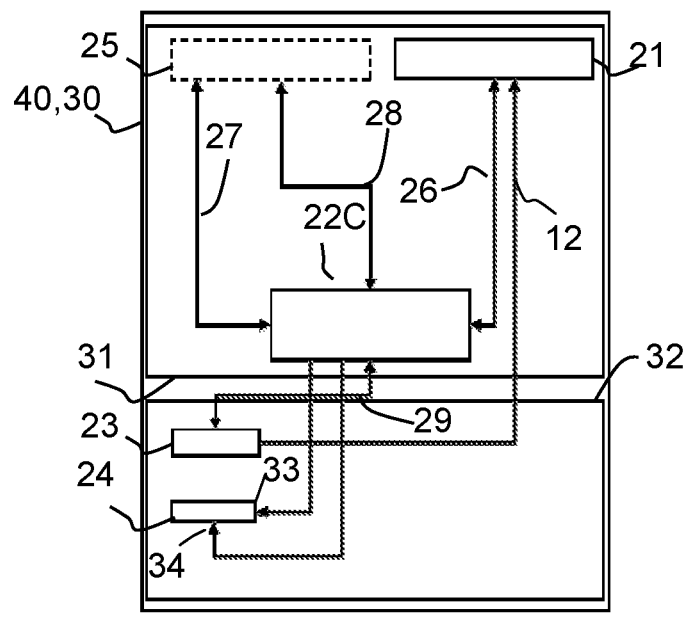

FIG. 3B shows an example of a sink unit 40 where a protocol management interface 22C is configured to receive a notification packet via the management link 24 and determine the timing of a communication link of an audio source member within a communication frame established by the coordinator transmitting the notification packet. By determining the timing of the communication link of the audio source member, the sink unit may then be synchronized to receive a Bluetooth audio stream protocol from the audio source member and decode the audio stream from the Bluetooth audio stream protocol via the data interface 25.

The sink unit may receive multiple notification packets which then leads the sink unit to be synchronized to multiple communication links of multiple audio source members. The sink unit may then be able to listen to multiple audio source members simultaneously or mixed.

Figure 4:
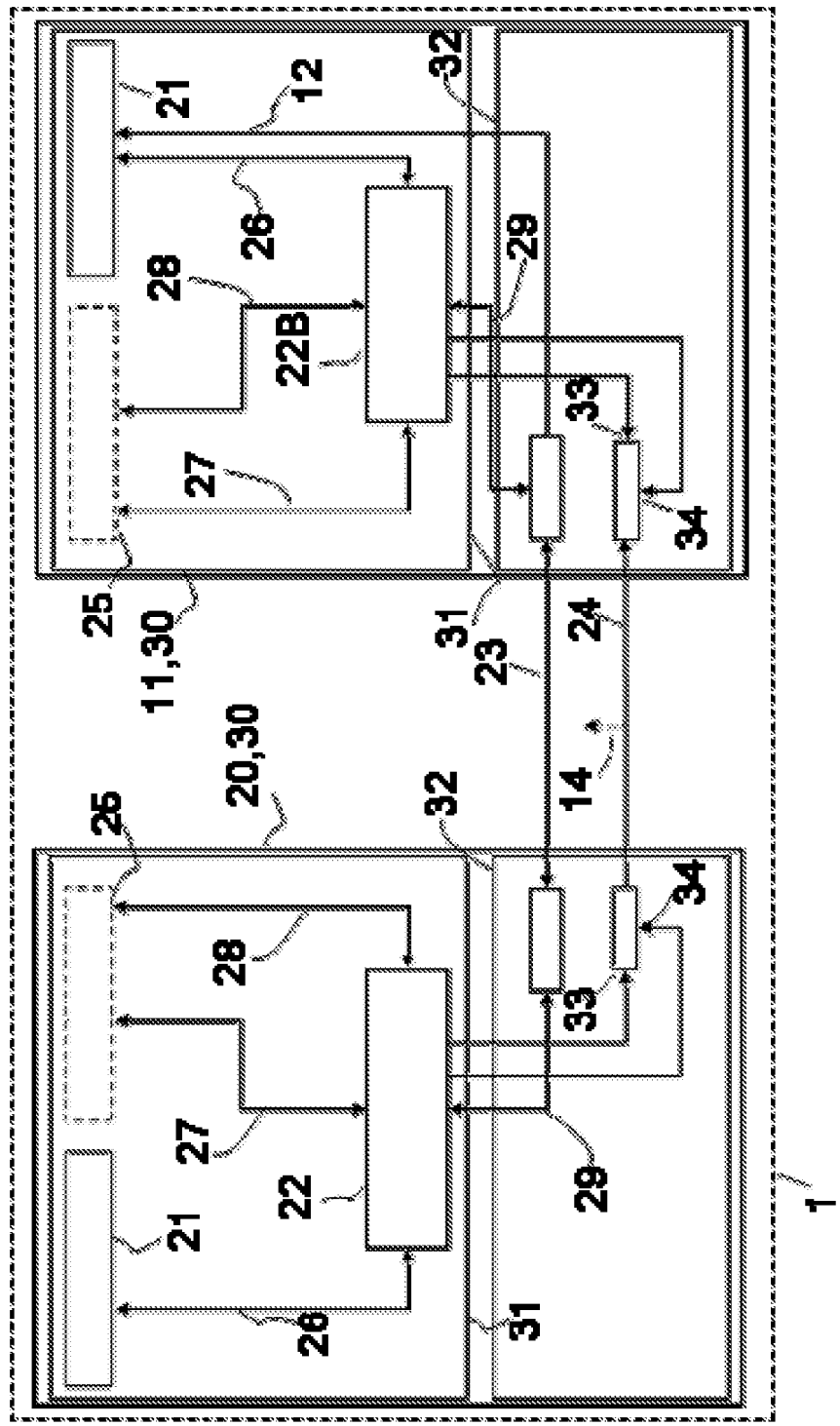
FIG. 4, illustrates an example of a wireless communication system.

FIG. 4 shows a wireless communication system 1 including a coordinator 20 and an audio source member 11. In this particular example both the coordinator 20 and the audio source member 11 are communicating via a management link 23 and/or a communication link 24.

The streaming of audio stream and/or embedded data to a sink unit is provided via one or more communication links 14.

Both the coordinator 20 and the audio source member 11 may have multiple communication links. By having multiple communication links transferring of stereo signal or high capacitive audio signal from the coordinator or the audio source member is possible. This example is not shown in FIG. 4.

In another example the coordinator 20 may be an intermediate device for a television and the audio source member 11 may be a mobile phone or a phone streamer device configured to stream a signal from a mobile phone to a hearing device. The coordinator may have assigned at least two communication links to itself for streaming a stereo signal to a sink unit (e.g. a hearing aid device). The stereo signal needs two communication links.

Figure 5:
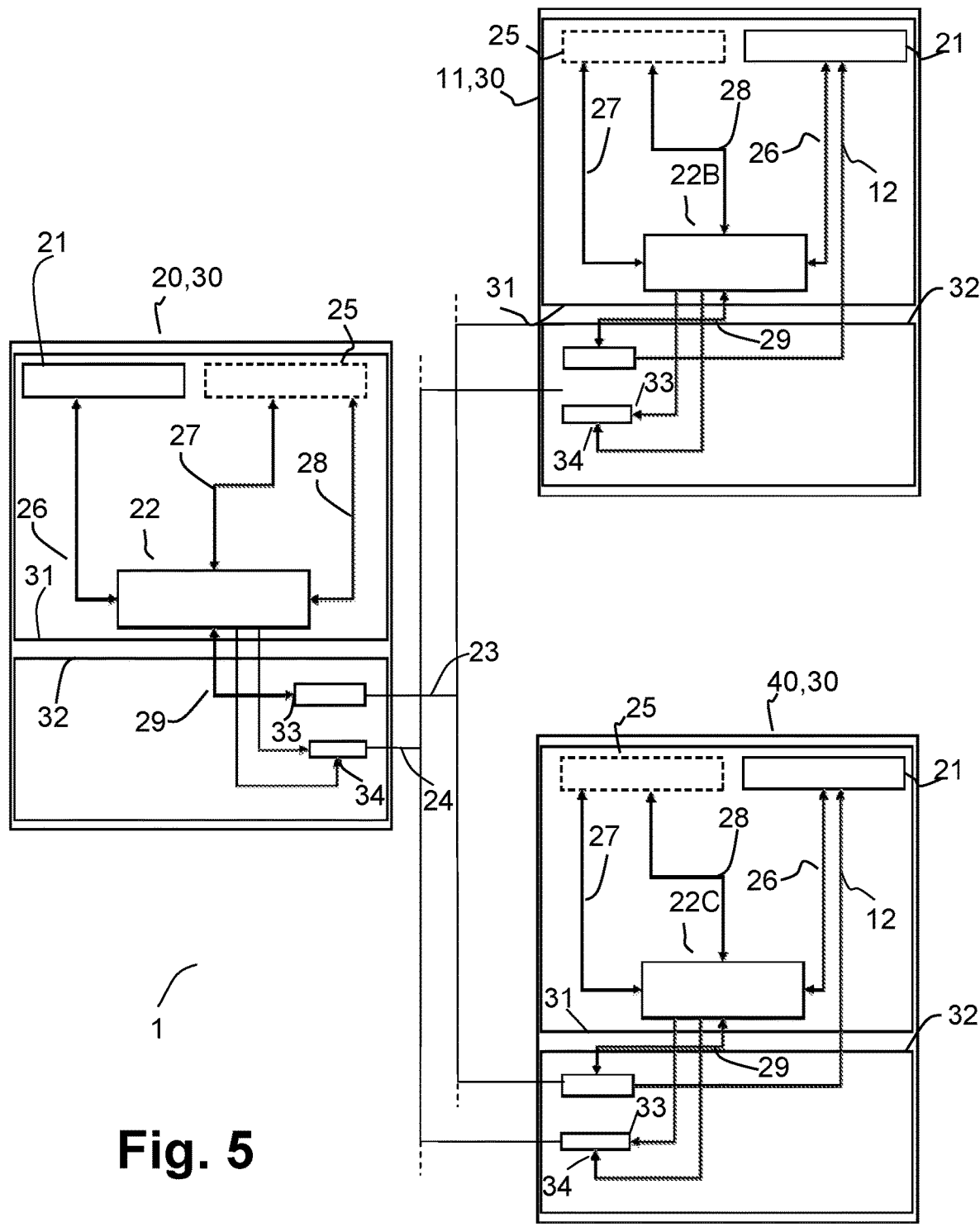
FIG. 5 illustrates an example of a wireless communication system.

FIG. 5 shows a wireless communication system 1 including a coordinator 20, an audio source member 11 and a sink unit 40. In this particular example the coordinator may be a first microphone used by a first school teacher, the audio source member may be a second microphone used by a second school teacher and the sink unit may be a single hearing aid used by a hearing impaired person.

The sink unit could be replaced with two sink units, and the two sink units could be for example a binaural hearing aid system used by a hearing impaired.

In the example shown in FIG. 5, the coordinator 20 transmit a notification packet via the management link and the audio source unit 11 receives the notification packet via the management link and analyses the notification packet via the protocol management interface 22B for available communication links in the communication frame 30 and the type of the communication group generated by the coordinator. If the type is acceptable to the audio source unit 11 and at least one communication link is available the audio source unit 11 transmit its ID information to the coordinator via the management link and a request on a number of communication links for use in communicating with the sink unit 40 and the coordinator 20. The coordinator 20 receives the ID information and assigns the requested number of communication links 24 in the communication frame 30 to the audio source unit 11. The audio source unit 30 becomes an audio source member 11 of the communication group.

The notification packet transmitted by the coordinator is received by the sink unit. The sink unit analysis via the protocol management interface 22C the notification packet to see whether the type of the communication group is acceptable and to see whether there are any communication links occupied by at least the coordinator 20 and/or the audio source member 11. If the type is acceptable and at least one communications link is occupied the sink unit starts to receive the audio stream and/or embedded data from the respective communication link(s) in the communication frame of the coordinator. The sink unit decodes the received audio streams, and for example a hearing impaired using a hearing aid device is able to listen what the first teacher and the second teacher are saying.

Figure 6:
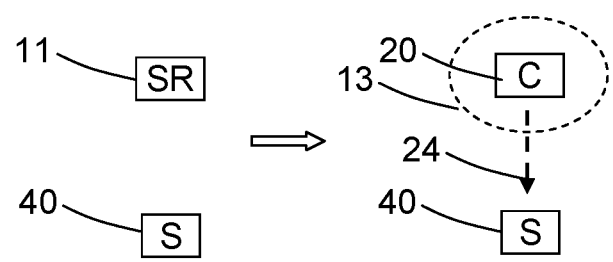
FIG. 6 illustrates a situation including an audio source unit becoming a coordinator.

FIG. 6 shows an audio source unit 11 searching for a notification packet. The audio source unit does create a communication group 13 of which it becomes a coordinator 20 of since it did not receive any notification packet or since it received a notification packet from a coordinator but the notification packet did not have the correct prioritization according to a prioritization scheme of the audio source unit 11.

The coordinator is now able to communicate via a communication link 24 to the sink unit 40.

Figure 7A:
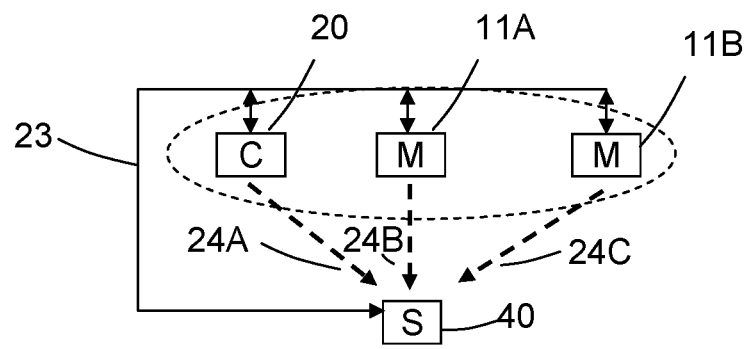
FIGS. 7A and 7B illustrates a situation where a sink unit receives audio streams and (or embedded data directly or indirectly from multiple audio source members,
  FIG. 8 illustrates a specific situation including multiple coordinators,
  FIG. 9 illustrates a situation including multiple communication groups and sink units,
  FIG. 10 illustrates a situation with multiple coordinators and the ability of the coordinator to coordinate and control a communication group.

FIG. 7A shows a communication group 13 established by the coordinator 20, and the communication group 13 comprises two audio source members 11A and 11B. The coordinator and the two audio source members communicate with a sink unit 40 via respective communication links (24A-24C).

Figure 7B:
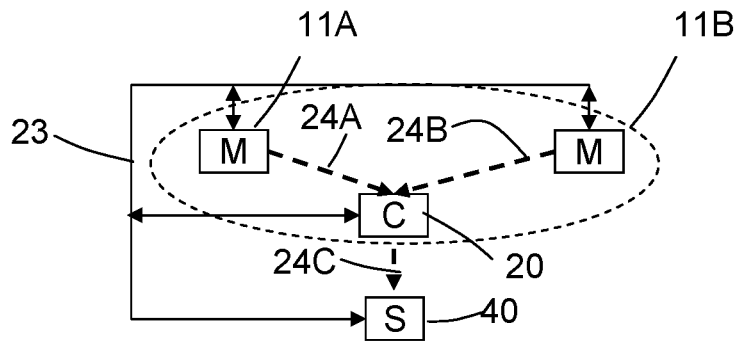

FIG. 7B shows a communication group established by the coordinator 20, and the communication group 13 comprises two audio source members 11A and 11B communicating via the coordinator to the sink unit 40. In this example, the coordinator 20 receives audio streams and/or embedded data from the respective audio source members (11A, 11B) via communication links (24A and 24B) assigned by the coordinator, and the coordinator assigns one or more communication links 24C to itself, i.e. the coordinator, and the sink unit is able to receive the audio streams and/or embedded data via the communication links 24C.

In this particular example, the coordinator could be a router configured to receive and forward the audio streams and/or embedded data from audio source members to one or more sink units.

Figure 8:
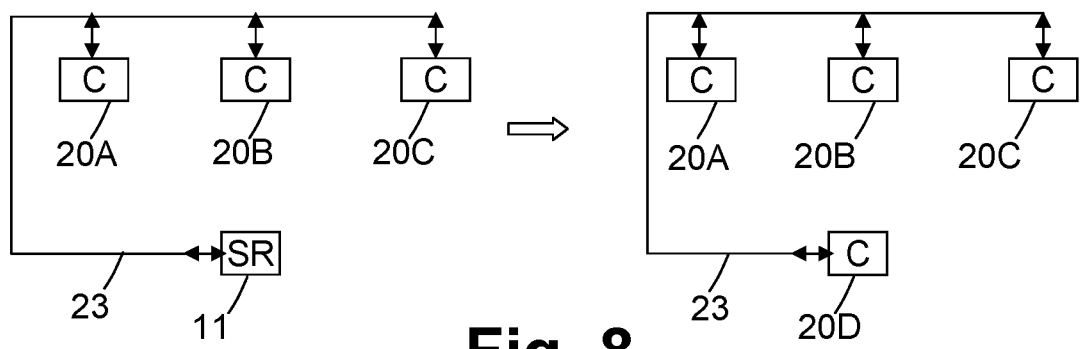

FIG. 8 illustrates a situation where an audio source unit 11 receives multiple notification packets via a management link 23, but none of the notification packets did come from a communication group with the wanted priority and/or none of the notification packets did have an available communication link. Therefore, the audio source unit creates a communication group of which it becomes a coordinator 20D of.

Figure 9:
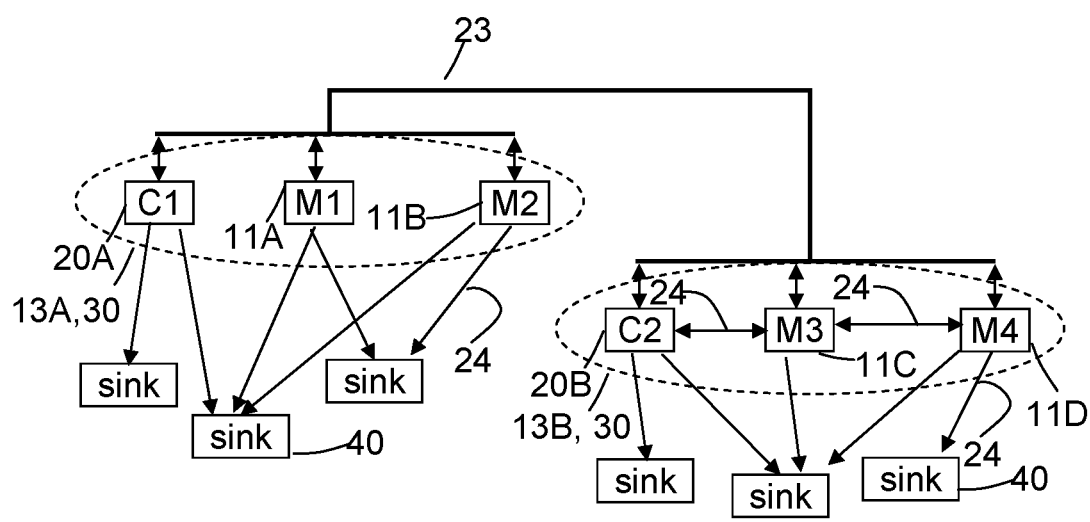

FIG. 9 illustrate a situation where the coordinator 20A is coordinating via the communication frame 30 the communication between a plurality of audio source members (11A, 11B) of the communication group 13A and at least a sink unit (40A, 40b, 40D) such that the at least sink unit (40A, 40b, 40D) is configured to receive communications from the plurality of audio source members simultaneously or mixed.

A second communication group 13B is coordinated via a second coordinator 20B, and within the second communication group the audio source members (11C, 11D) are configured to communicate and receive audio streams via communication links. In this particular example, the audio source member may be an intermediate streaming device, such as a router, transponder, relay etc., or a hearing device.

Figure 10:
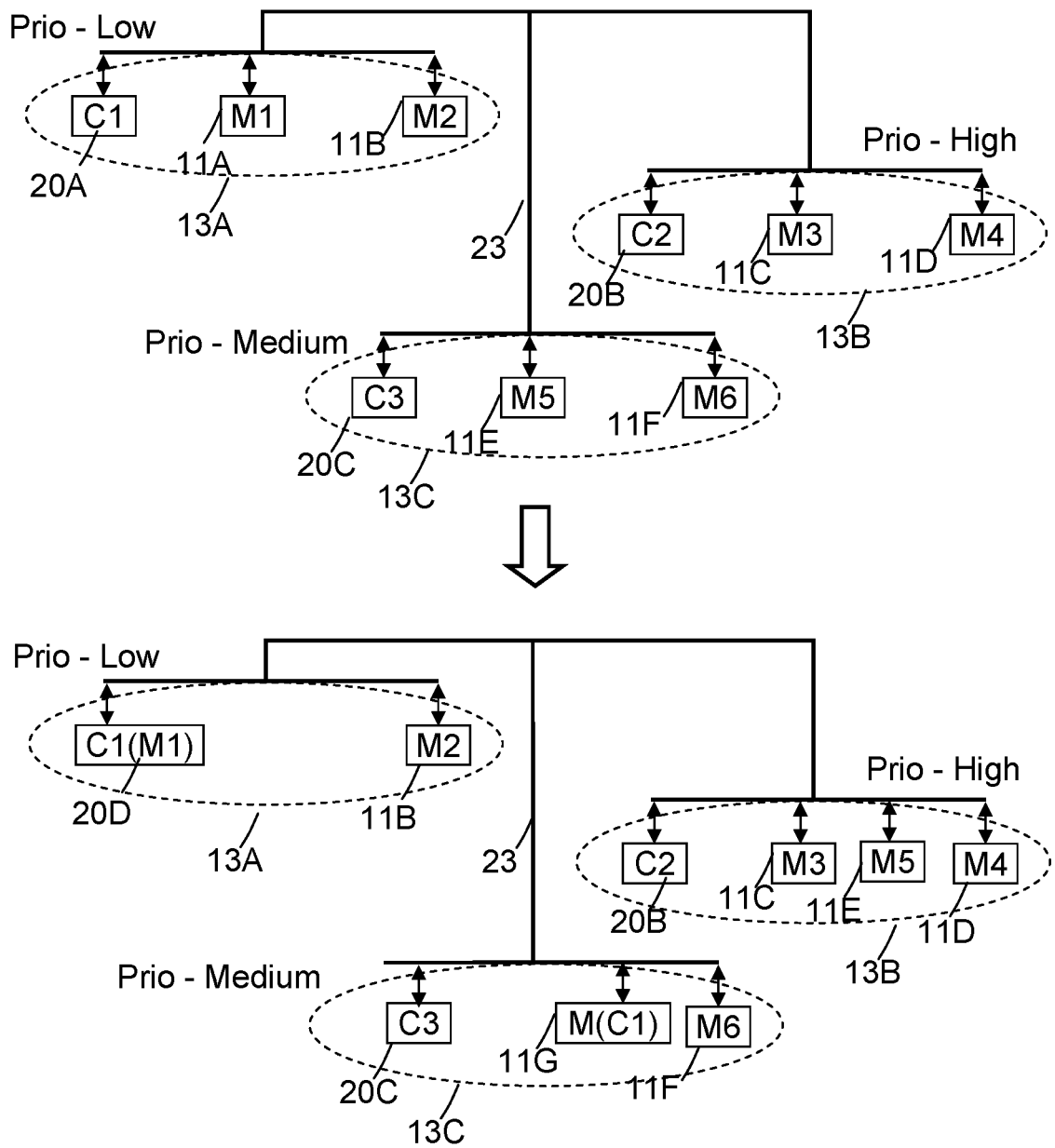

FIG. 10 illustrates a situation with three communication groups (13A, 13B, 13C). Each communication group has a coordinator (20A, 20B, 20C) and at least two audio source members (11A-11F). Each communication group has a priority which is different from the other communication groups.

FIG. 10 illustrates a situation wherein the coordinator 20C merges the communication group 13C with a second communication group 13B since at least an audio source member 11E of the communication group 13C has detected a second coordinator 20C of the second communication group 13B via the management link 23, and alternatively, with the protocol management interface. The audio source member 11E informs the coordinator 20C about the second communication group 13B and the coordinator 20C commands the audio source member 11E to transfer to the second communication group 13B via the management link 23 by forwarding the ID information of the audio source member 11E to the second coordinator 20B. In another example, the coordinator 20C may command the audio source member 11E to transfer to the second communication group 13B via the management link 23 by forwarding the ID information of the audio source member 11E to the second coordinator 20B when the coordinator 20C has communicated a merging request to the second coordinator 20C via the management link 23 and receives an accept on the merging signal from the second coordinator 20B. Alternatively, the coordinator 20C may command the audio source member 11E to transfer to the second communication group 13B, and the audio source member 11E may then transfer its ID information to the second coordinator 20B.

FIG. 10 illustrates another example, where the coordinator 20A receives a notification packet from a second coordinator 20C of a second communication group 13C via the management link 23, and according to a prioritization scheme the coordinator 20A is configured to leave the communication group 13A and join the second communication group 13C as an audio source member 11G of the second communication group 13C when transmitting an ID information via the management link 23 to the second coordinator 20C, and the second coordinator 20C confirms by assigning the coordinator 20A (11G) a time interval in a communication frame established by the second coordinator 20C.

FIG. 11 illustrates another example, the coordinator 20A transmits a coordinator request to an audio source member 11A of the communication group via the management link 23, and the coordinator 20A receives an accept from the audio source member 11A in response to the coordinator request, the audio source member 11A is then appointed as a new coordinator 20D of the communication group 13A.

The invention claimed is:

1. A method for coordinating communication in a wireless network topology, where the communication in the wireless network topology includes communication between a plurality of audio source members of a communication group and at least one sink unit, wherein the plurality of audio source members includes a first audio source unit and a second audio source unit, the method comprising:

by the first audio source unit, during a configuration period,
connecting to the wireless network topology via a connection management interface in a first communication frame,
listening for a notification packet in the wireless network topology via a management link in a link layer of the first communication frame, and wherein the management link is linked to the connection management interface,
establishing a communication group in the wireless network topology based on a first criteria, wherein the first criteria is based on that the first audio source unit does not receive a notification packet within the configuration period from a higher-priority audio source according to a prioritization scheme, the first audio source unit being a coordinator of the communication group and is also assigned to a first communication link,
establishing notification packets via a protocol management interface in the first communication frame and transmitting the notification packets via the management link assigned to a first time interval in the first communication frame, and
by the first audio source unit, during a data communication period, electronically transmitting a first audio stream via the first communication link directly to the at least one sink unit;
by the second audio source unit, during the configuration period,
connecting to the wireless network topology via a connection management interface in a second communication frame,
listening for a notification packet via a management link in a link layer of the second communication frame, wherein the management link is linked to the connection management interface and to the management link of the first audio source unit,
receiving one of the notification packets transmitted by the coordinator via the management link, and the notification packet includes link information to the management link of the coordinator of the communication group in the first communication frame,
in response to determining that the coordinator is a higher-priority audio source than the second audio source unit according to the prioritization scheme, transmitting an ID information via the management link to the coordinator by using the link information;
by the coordinator, during the configuration period,
assigning the second audio source unit to a second communication link in a second time interval of the first communication frame by using the ID information of the second audio source unit, and the second audio source unit is a second audio source member of the communication group, and
by the second audio source member, during the data communication period,
electronically transmitting a second audio stream via the second communication link directly to the at least one sink unit,
wherein the at least one sink unit includes a hearing aid synchronized to each of the first and second communication links to electronically receive the first and second audio streams, respectively, by receiving one of the notification packets transmitted by the coordinator,
wherein, according to the prioritization scheme, a stationary audio source unit has a higher priority than a mobile audio source unit, and a personal audio source unit has a lowest priority.

2. The method according to claim 1, wherein
when receiving the notification packet transmitted by the first audio source, if the second audio source unit is already a member of a communication group established by a lower-priority coordinator than the first audio source, the second audio source instructs the lower-priority coordinator to join the communication group established by the first audio source, thereby merging the communication groups and establishing the first audio source as the coordinator of the merged communication group.

3. A wireless communication system configured to establish a communication between a plurality of audio source members of a communication group and at least one sink unit in a wireless network topology,
wherein the plurality of audio source members includes a first audio source unit and a second audio source unit, wherein the first audio source unit comprises:
a connection management interface in a first communication frame configured to connect the first audio source unit to the wireless network topology,
a management link in a link layer of the first communication frame, wherein the management link is linked to the connection management interface, and wherein the first audio source unit is configured to listen for a notification packet via the management link during a configuration period, and
wherein the first audio source unit is configured to establish a communication group in the wireless network topology based on a first criteria, wherein the first criteria is based on that the first audio source unit does not receive a notification packet within the configuration period from a higher-priority audio source according to a prioritization scheme, wherein the first audio source unit is assigned to a first communication link, and the first audio source unit is a coordinator of the communication group, wherein the coordinator is configured to establish notification packets via a protocol management interface in the first communication frame and transmitting the notification packets via the management link assigned to a first time interval in the first communication frame, and wherein during a data communication period the first audio source member is configured to electronically transmit a first audio stream via the first communication link directly to the at least one sink unit,
wherein the second audio source unit comprises:
a connection management interface in a second communication frame configured to connect the second audio source unit to the wireless network topology,
a management link in a link layer of the second communication frame, wherein the management link is linked to the connection management interface and to the management link of the first audio source unit, and wherein the second audio source unit is configured to listen for a notification packet via the management link during the configuration period, and
wherein the second audio source unit is configured to
receive one of the notification packets, transmitted by the coordinator, via the management link during the configuration period, and the notification packet includes link information to the management link of the coordinator of the communication group in the first communication frame, and
in response to determining that the coordinator is a higher-priority audio source than the second audio source according to the prioritization scheme, transmit an ID information via the management link to the coordinator by using the link information,
wherein, during the configuration period the coordinator is configured to assign the second audio source unit to a second communication link in a second time interval of the first communication frame by using the ID information of the second audio source unit,
wherein, during the data communication period, the second audio source member is configured to electronically transmit a second audio stream via the second communication link directly to the at least one sink unit,
wherein the at least one sink unit includes a hearing aid synchronized to each of the first and second communication links to electronically receive the first and second audio streams, respectively, by receiving one of the notification packets transmitted by the coordinator, and
wherein, according to the prioritization scheme, a stationary audio source unit has a higher priority than a mobile audio source unit, and a personal audio source unit has a lowest priority.

4. The wireless communication system according to claim 3, wherein the first audio source unit and the second audio source unit each comprises a data interface in the first communication frame and the second communication frame, respectively, wherein the data interface is configured to generate audio streams and/or embedded data for being communicated to the sink unit via the second communication link for the second audio source member and via a third communication link assigned to a third time interval in the first communication frame for the coordinator.

5. The wireless communication system according to claim 4, wherein
the first audio source unit is further configured to establish the communication group alternatively based on a second criteria based on that the first audio source unit receives a notification packet from a coordinator, the notification packet is prioritized by the first audio source unit according to a prioritization scheme, and the first audio source unit is then configured to reject the notification packet if the prioritization of the notification packet is not acceptable of the first audio source unit.

6. The wireless communication system according to claim 4, wherein the coordinator is configured to merge the communication group with a second communication group when at least an audio source member of the communication group receives another link information from a second coordinator of the second communication group via the management link, and when the audio source member has transmitted the another link information to the coordinator via the management link;
the coordinator is configured to command the audio source member to transfer to the second communication group by forwarding the ID information of the audio source members of the communication group to the second coordinator via the management link by using the another link information, or
when the coordinator has communicated a merging request to the second coordinator via the management link and receives an accept on the merging request from the second coordinator, the coordinator is configured to command the audio source member to transfer to the second communication group via the management link by forwarding the ID information of the audio source member to the second coordinator by using the another link information, or
the coordinator is configured to command the audio source member to transfer to the second communication group, and the audio source member is configured to transfer its ID information to the second coordinator by using the another link information.

7. The wireless communication system according to claim 4, wherein the coordinator is configured to coordinate via the first communication frame the communication between the plurality of audio source members of the communication group and the at least one sink unit by assigning a communication link to each of the audio source members in the first communication frame, the at least one sink unit being configured to receive audio streams from the plurality of audio source members via the communication links in the first communication frame.

8. The wireless communication system according to claim 3, wherein the first audio source unit is further configured to establish the communication group, alternatively, based on a second criteria based on that the first audio source unit receives a notification packet from a coordinator, the notification packet is prioritized by the first audio source unit according to a prioritization scheme, and the first audio source unit is then configured to reject the notification packet if the prioritization of the notification packet is not acceptable of the first audio source unit.

9. The wireless communication system according to claim 8, wherein the coordinator is configured to merge the communication group with a second communication group when at least an audio source member of the communication group receives another link information from a second coordinator of the second communication group via the management link, and when the audio source member has transmitted the another link information to the coordinator via the management link;
- the coordinator is configured to command the audio source member to transfer to the second communication group by forwarding the ID information of the audio source members of the communication group to the second coordinator via the management link by using the another link information, or
- when the coordinator has communicated a merging request to the second coordinator via the management link and receives an accept on the merging request from the second coordinator, the coordinator is configured to command the audio source member to transfer to the second communication group via the management link by forwarding the ID information of the audio source member to the second coordinator by using the another link information, or
- the coordinator is configured to command the audio source member to transfer to the second communication group, and the audio source member is configured to transfer its ID information to the second coordinator by using the another link information.

10. The wireless communication system according to claim 8, wherein the coordinator is configured to coordinate via the first communication frame the communication between the plurality of audio source members of the communication group and the at least one sink unit by assigning a communication link to each of the audio source members in the first communication frame, the at least one sink unit being configured to receive audio streams from the plurality of audio source members via the communication links in the first communication frame.

11. The wireless communication system according to claim 3, wherein the coordinator is configured to merge the communication group with a second communication group when at least an audio source member of the communication group receives another link information from a second coordinator of the second communication group via the management link, and when the audio source member has transmitted the another link information to the coordinator via the management link;
- the coordinator is configured to command the audio source member to transfer to the second communication group by forwarding the ID information of the audio source members of the communication group to the second coordinator via the management link by using the another link information, or
- when the coordinator has communicated a merging request to the second coordinator via the management link and receives an accept on the merging request from the second coordinator, the coordinator is configured to command the audio source member to transfer to the second communication group via the management link by forwarding the ID information of the audio source member to the second coordinator by using the another link information, or
- the coordinator is configured to command the audio source member to transfer to the second communication group, and the audio source member is configured to transfer its ID information to the second coordinator by using the another link information.

12. The wireless communication system according to claim 3, wherein the coordinator is configured to coordinate via the first communication frame the communication between the plurality of audio source members of the communication group and the at least one sink unit by assigning a communication link to each of the audio source members in the first communication frame, the at least one sink unit being configured to receive audio streams from the plurality of audio source members via the communication links in the first communication frame.

13. The system according to claim 3, wherein
when receiving the notification packet transmitted by the first audio source, if the second audio source unit is already a member of a communication group established by a lower-priority coordinator than the first audio source, the second audio source instructs the lower-priority coordinator to join the communication group established by the first audio source, thereby merging the communication groups and establishing the first audio source as the coordinator of the merged communication group.

14. A coordinator of a communication group in a wireless network topology, wherein the coordinator is configured to coordinate communication between a plurality of audio source members of the communication group and at least one sink unit in a network topology, the coordinator comprises:
- a connection management interface in a first communication frame configured to connect the coordinator to the wireless network topology,
- a management link in a link layer of the first communication frame, wherein the management link is linked to the connection management interface, and wherein the coordinator is configured to listen for a notification packet via the management link during a configuration period,
- and during the configuration period the coordinator is configured to
  - establish a communication group in the wireless network topology based on a criteria that the first audio source unit does not receive a notification packet within the configuration period from a higher-priority audio source according to a prioritization scheme, establish notification packets including link information of the management link via the protocol management interface and transmit the notification packets via the management link assigned to a first time interval in the communication frame, and receive ID information from at least one audio source unit via the management link, the ID information being transmitted by each of the at least one audio source unit in response to receiving one of the transmitted notification packets and determining that the coordinator is a higher-priority audio source than the corresponding audio source unit according to the prioritization scheme, in response to receiving the ID information, assign other time intervals for respective communication links of multiple audio source units in the communication frame, such that the multiple audio source units become audio source members of the communication group configured to electronically transmit respective audio streams directly to the at least one sink unit during a data communication period, wherein the at least one sink unit includes a hearing aid synchronized to each of the respective communication links to electronically receive the audio streams transmitted by the multiple audio source units, by receiving one of the notification packets transmitted by the coordinator, and wherein, according to the prioritization scheme, a stationary audio source unit has a higher priority than a mobile audio source unit, and a personal audio source unit has a lowest priority.

15. The coordinator according to claim 14, wherein the coordinator receives a notification packet from a second coordinator of a second communication group via the management link, and according to a prioritization scheme, the coordinator is configured to leave the communication group and join the second communication group as an audio source member of the second communication group when transmitting an ID information via the management link to the second coordinator, and the second coordinator confirms by assigning the coordinator a time interval in a communication frame established by the second coordinator.

16. The coordinator according to claim 14, the coordinator is configured to transmit a coordinator request to an audio source member of the communication group via the management link, and if the coordinator receives an accept from the audio source member in response to the coordinator request, the audio source member is then appointed as the coordinator of the communication group.

17. The coordinator according to claim 14, wherein a plurality of audio source members of the communication group is configured to communicate to the at least one sink unit simultaneously or in parallel.

18. The coordinator according to claim 14, wherein when receiving the notification packet transmitted by the coordinator, if one of the at least one audio source unit is already a member of a communication group established by a lower-priority coordinator than the coordinator from which the notification packet is received, the one of the at least one audio source unit instructs the lower-priority coordinator to join the communication group established by the higher-priority coordinator, thereby merging the communication groups and establishing the higher-priority coordinator as the coordinator of the merged communication group.

19. An audio source unit configured to be one of multiple audio source members of a communication group coordinated by a coordinator in a wireless network topology, and where the audio source unit is configured to communicate to at least one sink unit, the audio source unit comprises:

a connection management interface in a communication frame configured to connect the audio source unit to the wireless network topology, a management link in a link layer of the communication frame, wherein the management link is linked to the connection management interface and to a management link of another audio source unit or the coordinator, wherein the audio source unit is configured to listen for a notification packet via the management link during a configuration period, wherein the coordinator is configured to establish the communication group in the wireless network topology based on a criteria that the first audio source unit does not receive a notification packet within the configuration period from a higher-priority audio source according to a prioritization scheme, wherein the audio source unit is configured to receive the notification packet transmitted by a coordinator via the management link during the configuration period, and the notification packet includes link information to the management link in a communication frame of the coordinator, in response to determining that the coordinator is a higher-priority audio source than the audio source unit according to the prioritization scheme, transmit an ID information via the management link to the coordinator by using the link information, wherein, during the configuration period the audio source unit becomes an audio source member of the communication group in response to the coordinator assigning the audio source unit to a communication link in a time interval of the communication frame of the coordinator by using the ID information of the audio source unit, and the multiple audio source members of the communication group are assigned respective communication links in respective time intervals of the communication frame, and during a data communication period the multiple audio source members are configured to electronically transmit audio streams via the respective communication links directly to the at least one sink unit, wherein the at least one sink unit includes a hearing aid synchronized to each of the respective communication links to receive the audio streams electronically transmitted by the multiple audio source members, by receiving one of the notification packets transmitted by the coordinator, and wherein, according to the prioritization scheme, a stationary audio source unit has a higher priority than a mobile audio source unit, and a personal audio source unit has a lowest priority.

20. The audio source unit according to claim 19, comprises a data interface configured to generate audio streams and/or embedded data for being communicated to the at least one sink unit via the communication link.

21. The audio source unit according to claim 19, wherein the communication link is based on Bluetooth low energy communication protocol.

22. The audio source unit according to claim 19, wherein the audio source unit is a combination of a sink unit and an audio source unit, the audio source unit being configured to communicate and receive audio streams, the audio source unit being a combination of:

an intermediate streaming device, and a hearing device.

23. The audio source unit according to claim 19, where the audio source unit is configured to be a coordinator of the communication group when accepting a coordinator request transmitted by the coordinator of the communication group via the management link.

24. The audio source unit according to claim 19, wherein when receiving the notification packet transmitted by the coordinator, if the second audio source unit is already a member of a communication group established by a lower-priority coordinator than the coordinator from which the notification packet is received, the audio source instructs the lower-priority coordinator to join the communication group established by the higher-priority coordinator, thereby merging the communication groups and establishing the higher-priority coordinator as the coordinator of the merged communication group.

* * * * *